United States Patent [19]

Sudmanns

[11] Patent Number: 5,189,879
[45] Date of Patent: Mar. 2, 1993

[54] EXHAUST GAS LINE FOR AN INTERNAL-COMBUSTION ENGINE AND ITS METHOD OF MANUFACTURE

[75] Inventor: Hans Sudmanns, Friedrichshafen, Fed. Rep. of Germany

[73] Assignee: MTU Friedrichshafen GmbH, Fed. Rep. of Germany

[21] Appl. No.: 718,258

[22] Filed: Jun. 20, 1991

[30] Foreign Application Priority Data

Jul. 4, 1990 [DE] Fed. Rep. of Germany ....... 4021326

[51] Int. Cl.$^5$ .......................... F21N 3/02; F21N 7/10
[52] U.S. Cl. ...................................... 60/321; 60/322; 60/323
[58] Field of Search ................. 60/282, 321, 322, 323; 123/41.79, 41.8, 570

[56] References Cited

U.S. PATENT DOCUMENTS

| 2,034,119 | 3/1936 | Shebat | 60/323 |
| 4,658,580 | 4/1987 | Schley et al. | 60/322 |
| 4,693,079 | 9/1987 | Wuensche et al. | 60/320 |

Primary Examiner—Ira S. Lazarus
Assistant Examiner—L. Heyman
Attorney, Agent, or Firm—Barnes & Thornburg

[57] ABSTRACT

The invention relates to an exhaust gas line for internal-combustion engines which is essentially free of tension at normal engine operating temperature. The exhaust gas line is enclosed by a water-cooled and gastight housing and is manufactured from a helically wound metal strip. Tensions that are the result of axial thermal expansion due to the temperature of the engine are avoided because the edges of the metal strip, in a cold state of the exhaust gas line, are aligned with respect to each other to produce a helical gap therebetween. The gap is just closed due to axial expansion of the exhaust gas line at normal engine operating temperature. Tensions that result from a radial expansion of the exhaust gas line are avoided because the exhaust gas line is mounted in a cold state while being subjected to a radial prestress. The prestress is just compensated for as a result of radial expansion at the normal engine operating temperature. The exhaust line is mounted to an engine housing by fasteners extending through bores in the metal strip. A jig and method for determining the location of the bores along the metal strip is provided.

2 Claims, 2 Drawing Sheets

EXHAUST GAS LINE FOR AN INTERNAL-COMBUSTION ENGINE AND ITS METHOD OF MANUFACTURE

BACKGROUND AND SUMMARY OF THE INVENTION

The invention relates to an exhaust gas line for an internal-combustion engine which, in the cold state, is subjected to prestress which is eliminated at normal engine operating temperature.

An exhaust gas line of this general type is disclosed in German Patent Document DE-PS 36 35 478. There, the exhaust gas line comprises several sections which are each composed of two groove-shaped parts which, resting on one another by means of flanges molded to both longitudinal edges, form a line cross-section between one another. During mounting, a radial prestress is generated by means of expanding which, when the normal operating temperature is reached, is compensated for as a result of thermal expansion. In the axial direction, gaps are situated between the individual sections so that relative movements between sections that occur in the longitudinal direction because of thermal expansion, are not impaired. At the normal operating temperature, the gaps are almost closed so that only a little exhaust gas can leak out into the space between the interior line and the gastight liquid-cooled housing surrounding the interior line. A disadvantage of this type of construction consists in the high expenditures in manufacturing and the mounting of the exhaust gas line. In addition a large installation space is required.

An exhaust gas line according to the German Patent Document DE-PS 37 43 851 is constructed as a one-piece pipe section which is used for guiding hot exhaust gases from an exhaust pipe to an exhaust gas turbine. In order to allow for axial expansion, the fastening of the exhaust gas line on the surrounding water-cooled housing takes place by means of screws which are distributed in a cross-sectional plane. In the cold condition, the exhaust gas line has a smaller radial dimension than the diameter on which the fastening points are situated. As a result, the exhaust gas line experiences a radial deformation during the cold mounting. The deformation of the exhaust gas line, which is a result of this chucking, is compensated by the thermal expansion at the normal operating temperature, and the exhaust gas line is therefore virtually free of tension at the normal operating temperature. This type of an exhaust gas line naturally has only a limited overall length. When exhaust gas lines of a larger length are required, the exhaust gas line must be constructed of several individual pipe sections which are lined up with one another. However, this results in high expenditures for manufacturing and mounting.

European Patent Document EP-PA 0 185 934 shows a flexible hose wound from metal strips which may also be used in exhaust gas systems for internal-combustion engines. In such a hose, the individual windings can also be constructed to be axially displaceable with respect to one another so that thermal expansions in the axial direction are permitted. However, the patent does not state how such an exhaust gas line can be disposed without any tension at high exhaust gas temperatures.

It is an object of the invention to provide a one-piece exhaust gas line of any arbitrary length, which can be manufactured at low cost, is easy to mount, and which is essentially free of tension at normal operating temperatures.

This object can be achieved by having an internal-combustion engine exhaust gas line enclosed by a gas-tight water-cooled housing to which it is fastened at several points in such a manner that in a cold state, the exhaust gas line is subjected to a radial prestress which is just eliminated at normal engine operating temperature. The exhaust gas line is made of a helically wound metal strip. In order to avoid tensions as a result of an axial thermal expansion of the exhaust gas line, the exhaust gas line is fastened to the surrounding water-cooled housing in such a manner that the edges of the metal strip in the cold state of the exhaust gas line are aligned to form a helical gap therebetween. In order to avoid leaking of exhaust gases into the space between the interior exhaust gas line and the exterior housing, the gap is just closed at normal engine operating temperature due to thermal expansion of the strip. In order to prevent tensions as a result of a radial expansion of the exhaust gas line, the exhaust gas line is also fastened in such a manner that it is radially prestressed in the cold state. However, because of thermal expansion, the radial deformation resulting from the prestress at the cold temperature is compensated so that at normal engine operating temperatures, the exhaust ga line is essentially free of tension.

So that the prestress (created during a cold mounting) can be compensated, the gap between the edges of the metal strip is precisely maintained. A method for determining the position of mounting bores in the strip can be precisely determined irrespective of manufacturing tolerances by: (1) forming a flat metal strip; (2) helically coiling the strip so that side edges of the strip are spaced from one another to form a helical gap; (3) screwingly inserting a coil spring into the gap so as to fill the gap with the spring; (4) feeding the coiled strip and spring into an internal cylindrical cavity in a drilling jig that has cut-outs for determining the location of the bores and which has an internal diameter which is less than the internal diameter of the exhaust line when in an expanded shape due to thermal expansion caused by exhaust gas of the internal-combustion engine; (5) applying an axial force to one end of the coiled strip to force another end of the coiled strip against a bottom of the cylindrical cavity and cause the coil strip to expand to said internal diameter of the cylindrical cavity so that the location for the bores in the exhaust line are identified at the cut-outs in the drilling jig.

Other objects, advantages and novel features of the present invention will become apparent from the following detailed description of the invention when considered in conjunction with the accompanying drawings.

DETAILED DESCRIPTION OF THE DRAWINGS

Figure 1:
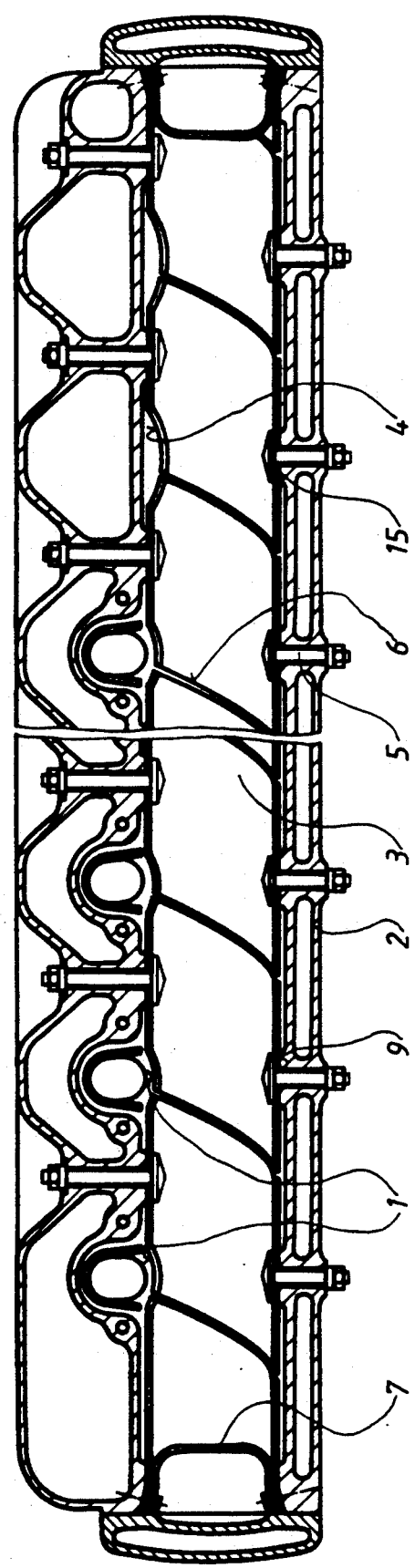
FIG. 1 is a longitudinal sectional view of the exhaust gas line and the water-cooled housing enclosing the exhaust gas line.

FIG. 1 illustrates an exhaust gas plenum line for an internal-combustion engine. The exhaust gas emerges from the cylinders of the internal-combustion engine, via openings 1 and enters into the exhaust gas line 3 which is enclosed by the water-cooled gastight housing 2. The exhaust gas line 3 is wound helically from a sheet-metal strip. The exhaust gas line 3 is fastened to projections 9 on the housing 2 by means of screws 5 entering through bores 15 in the sheet metal strip and passing through the projections 9. The bores 15 (used in fastening of the exhaust gas line 3 by means of the screws 5) are preferably arranged in the center line of the sheet metal strip that is used to form the exhaust line 3. The bores 15 are so located to one another that when the exhaust line is formed by winding the sheet strip helically, adjoining bores are disposed on the circumference of the exhaust line, offset by 180°. Thus, for each turn of the wound helix, two screws 5 are required which are disposed opposite one another in an axially offset manner with one mounted between the engine cylinders and the other opposite the cylinder as seen in FIG. 1. The ends of the exhaust gas line 3 are closed off by end pieces 7. In the cold state of the exhaust gas line 3, the long edges 6 of the helically wound sheet-metal strip are aligned with respect to one another to create a gap therebetween. At the same time, the exhaust gas line 3 is ovally deformed because it has a radially smaller dimension with respect to the fastening points on the housing 2 adjacent screws 5 then inwardly and upwardly as viewed in FIG. 1. At the normal engine operating temperature, this previously ovally deformed pipe becomes round because of radial expansion due to engine heat. At the same time, because of heat expansion at the normal engine operating temperature, an axial expansion of the strip occurs to just close the helical gap between adjoining edges 6. At the normal engine operating temperature, the exhaust gas line 3 is therefore virtually free of tension and at the same time it is securely fastened. In this case, it is particularly advantageous that the exhaust gas line can be manufactured in one piece with low expenditures and may be of an arbitrary length. The openings 1 and 4 for the inlet and outlet of the exhaust gas are stamped into the sheet metal strip before it is wound to form the gas line.

For the proper functioning of the exhaust gas line 3, it is imperative to maintain the gap and the outside diameter of the exhaust gas line 3 according to precise measurements. If the gaps are not closed at the normal engine operating temperature, heat losses would occur which would result in a reduction of the useful power in an exhaust gas turbine turbocharger (not shown) acted upon by exhaust gas. If the gap is too small the sides 6 will abut each other to cause axial stress. If as a result of manufacturing tolerances, the outside diameter of the exhaust gas line is not precisely observed, undesirably high tension may occur at the normal engine operating temperature of the exhaust gas line since the exhaust line will not assume a circular shape.

Figure 2:
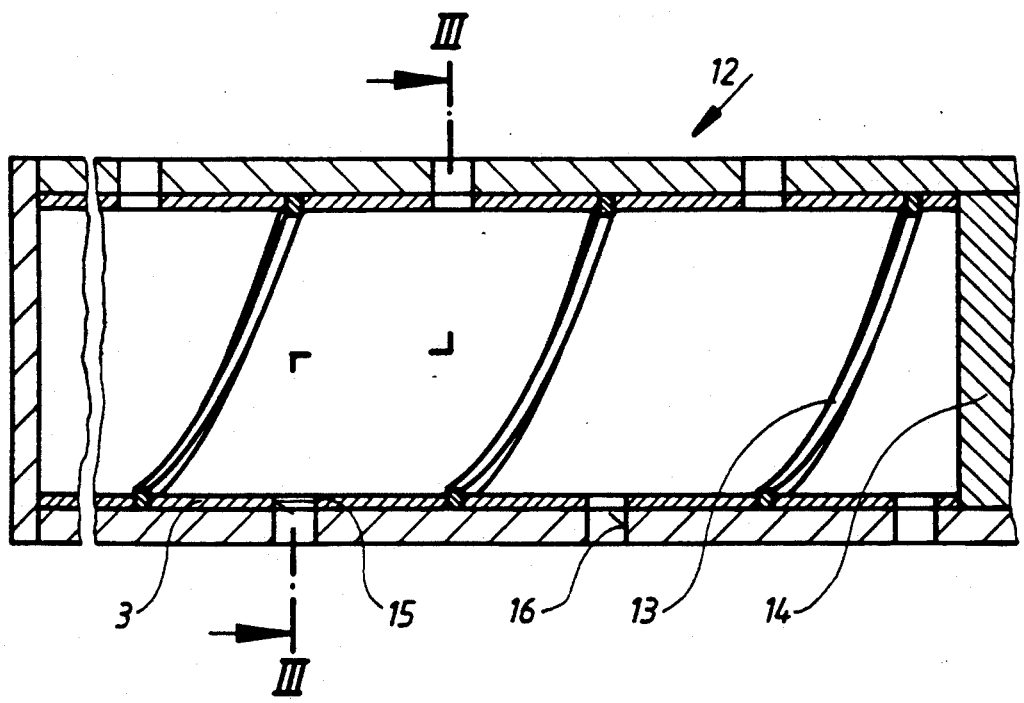
FIG. 2 is a longitudinal sectional view of an arrangement for the determination of bores for the fastening of the exhaust gas line to the housing.
Figure 3:
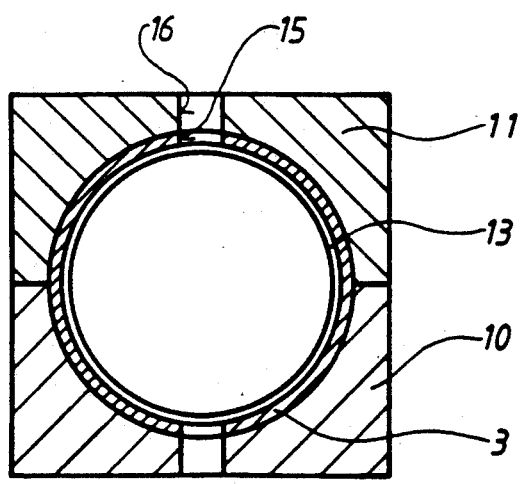
FIG. 3 is a cross-sectional view of the arrangement according to FIG. 2 along the intersecting line III—III shown in FIG. 2.

By use of the drill jig arrangement shown in FIG. 2 and 3, the position of the bores 15 for the fastening of the exhaust gas line 3 to the housing 2 can be determined precisely irrespective of possible manufacturing tolerances. Here the strip is helically wound to form the exhaust gas line 3 and a rectangular spring 13 is inserted into the gap with its turns. This assembled helical strip and spacing spring assembly is then inserted into a cylinder drilling jig 12 composed of a base plate 10 and a cover 11. The inside diameter of the jig 12, in comparison to the diameter on which the fastening points in the housing 2 are situated, has a predetermined smaller dimension so that, in the cold state after the mounting, a predetermined deformation of the exhaust gas line 3 is obtained. When affected by an axial force by means of a piston 14, the exhaust gas line 3 places itself against the inner circumference of the jig 12. In this position of the exhaust gas line 3, the positions of the bores 15 are determined for the fastening of the exhaust gas line 3 to the housing 2 by preset bores 16 that are worked into the base plate 10 and into the covering 11. They are used as templates for drilling the corresponding bores 15 in the strip making up the exhaust gas line 3.

The pitch of the turn of the helical metal strip corresponds preferably to the cylinder spacing of the engine but may also be an integral multiple of it.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An exhaust gas line for an internal-combustion engine, wherein the exhaust gas line is enclosed by a gastight water-cooled housing to which it is fastened at several points in such a manner that in a cold state the exhaust gas line is subjected to a radial prestress which is just eliminated at engine operating temperature; wherein the improvement comprises that the exhaust gas line is a metal strip which is helically wound into a tube in such a manner that, in the cold state of the exhaust gas line side edges of the metal strip are aligned to produce a gap therebetween; said gap having a width
    wherein upon heating of the wound metal strip to normal engine operating temperatures, the gap is just closed by thermal expansion of the metal strip.

2. An exhaust gas line according to claim 1, wherein plural bores are disposed along the center line of the metal strip for receiving fastener means for the fastening of the exhaust gas line to the housing; and
    wherein adjacent bores in the strip are offset by approximately 180° about the circumference of the exhaust gas line when the strip is helically wound into a tube.

* * * * *